US 8,806,583 B2

(12) United States Patent
Tom

(10) Patent No.: US 8,806,583 B2
(45) Date of Patent: Aug. 12, 2014

(54) REMOTE VIDEO SOURCE AUTHENTICATION PROTOCOL

(75) Inventor: Alfred C. Tom, San Francisco, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 164 days.

(21) Appl. No.: 13/409,275

(22) Filed: Mar. 1, 2012

(65) Prior Publication Data

US 2012/0297458 A1    Nov. 22, 2012

Related U.S. Application Data

(60) Provisional application No. 61/486,839, filed on May 17, 2011.

(51) Int. Cl.
*H04L 29/06* (2006.01)
*H04W 12/06* (2009.01)
*G06F 21/44* (2013.01)
*H04W 84/18* (2009.01)

(52) U.S. Cl.
CPC .............. *G06F 21/445* (2013.01); *H04W 84/18* (2013.01); *H04W 12/06* (2013.01); *H04L 63/0869* (2013.01); *H04L 63/18* (2013.01)
USPC ............ 726/4; 726/21; 455/426.1; 455/456.1

(58) Field of Classification Search
USPC ......... 709/202, 206, 217, 219, 224, 227, 231; 719/320; 717/178; 715/716, 866, 864; 726/2–4, 21; 455/426.1, 456.1
See application file for complete search history.

(56) References Cited

U.S. PATENT DOCUMENTS

| | | | | |
|---|---|---|---|---|
| 6,970,703 | B2 * | 11/2005 | Fuchs et al. | 455/426.1 |
| 7,502,353 | B2 * | 3/2009 | Bolz | 370/338 |
| 7,966,111 | B2 * | 6/2011 | Moinzadeh et al. | 701/29.6 |
| 8,176,534 | B2 * | 5/2012 | Mangalore et al. | 726/6 |
| 8,224,313 | B2 * | 7/2012 | Howarter et al. | 455/420 |
| 2003/0147534 | A1 * | 8/2003 | Ablay et al. | 380/270 |
| 2009/0249074 | A1 * | 10/2009 | Madhavan et al. | 713/176 |
| 2009/0270113 | A1 * | 10/2009 | Feher | 455/456.1 |
| 2010/0124920 | A1 * | 5/2010 | Feher | 455/426.1 |
| 2010/0235425 | A1 * | 9/2010 | Holden et al. | 709/202 |
| 2010/0235454 | A1 * | 9/2010 | Holden et al. | 709/206 |

* cited by examiner

*Primary Examiner* — Hadi Armouche
*Assistant Examiner* — Hee Song

(57) ABSTRACT

A method and system of enabling slave software applications from a portable device via a vehicle interface system. The vehicle includes a first communication channel for exchanging data communications between the portable device and the vehicle interface system and a second communication channel configured to transmit video to the vehicle interface system. A mutual authentication is performed between the portable device and the vehicle interface system using the first communication channel based on identifying the portable device as an entity authorized to execute approved slave software applications. The portable device is authenticated over the second communication channel for verifying that the portable device is the authorized entity to transmit video over the second communication channel. The video is transmitted to the vehicle interface system over the second communication channel conditioned upon a successful authentication of the portable device over the second communication channel.

20 Claims, 3 Drawing Sheets

REMOTE VIDEO SOURCE AUTHENTICATION PROTOCOL

CROSS-REFERENCE TO RELATED APPLICATIONS

This application claims priority of U.S. Provisional Application Ser. No. 61/486,839 filed May 17, 2011, the disclosure which is incorporated by reference.

BACKGROUND OF INVENTION

An embodiment relates generally to external device integration within a vehicle.

Mobile devices are becoming increasingly important in people's lives. Devices are used not only for phone calls, but also for text messaging, social networking, navigation, entertainment, reading, and literally thousands of other applications. Unfortunately the act of driving and the act of using a phone can often lead to unsafe driving. Technologies like Bluetooth have allowed drivers to use their phones for calls while driving in a relatively safe manner. Recently new technologies have been introduced that could enable consumers to use many applications on their phone in a safe manner while driving. These technologies use various mechanisms to present a safe phone user-interface to the driver. Some of these technologies allow the device to directly project a video image to the screen in the center stack of the vehicle. With this technique the device controls what the user sees on the vehicle screen, and therefore it is important that only devices that are approved and known to only project non-distracting images be allowed to project video to the vehicle screen. However, if the device uses a video signaling mechanism outside of a channel used to authenticate the device, then there is a security hole that allows an unapproved device to send video to the vehicle screen using the out-of-band channel while the vehicle assumes that it is communicating with the approved device.

SUMMARY OF INVENTION

One of the many advantages as described herein is a re-validation of a portable device that transmits video to a vehicle over a video configured connection for preventing an unauthorized third party from maliciously transmitting video over the video connection. The portable device is first authenticated using a generic data connection between the portable device and the vehicle. The portable device is re-validated over a video connection prior to transmitting video over the video connection for assuring that the portable device is the pre-approved device that was validated via the generic data connection. This prevents third parties from maliciously hacking into the communication connection and transmitting unauthorized video.

An embodiment contemplates a method of enabling slave software applications from a portable device via a vehicle interface system. The portable device includes at least one executable slave software application. The vehicle includes a first communication channel for exchanging data communications between the portable device and the vehicle interface system. The vehicle includes a second communication channel configured to transmit video to the vehicle interface system. A mutual authentication is performed between the portable device and the vehicle interface system using the first communication channel based on the vehicle interface system identifying the portable device as an entity authorized to execute approved slave software applications via the vehicle interface device. The portable device initiates communication over the second communication channel for transmitting video from the portable device to the vehicle interface system. The video includes a graphical user interface for controlling the slave software applications. The portable device is authenticated over the second communication channel for verifying that the portable device is the authorized entity transmitting the video over the second communication channel. The video is transmitted to the vehicle interface system over the second communication channel conditioned upon a successful authentication of the portable device over the second communication channel.

An embodiment contemplates a portable device-to-vehicle interface system. A portable device includes executable slave software applications. A vehicle interface system includes a human machine interface for displaying video having a graphical user interface for execution and control of slave software applications stored on the portable device. The video displayed on the human machine interface is transmitted from the portable device. A first communication channel for exchanging data communications between the portable device and the vehicle interface system. A second communication channel is configured to transmit video from the portable device to the vehicle interface system. A mutual authentication between the portable device and the vehicle interface system is performed over the first communication channel. The portable device is identified as an entity authorized to execute slave software applications via the vehicle interface device. The portable communication device initiates communication over the second communication channel for transmitting video over the second communication channel. The portable device is authenticated over the second communication channel for verifying that the portable device is the authorized entity transmitting the video over the second communication channel. The portable device transmits video of an approved slave software application to the vehicle interface system over the second communication channel conditioned upon a successful authentication of the portable device over the second communication channel.

DETAILED DESCRIPTION

Figure 1:
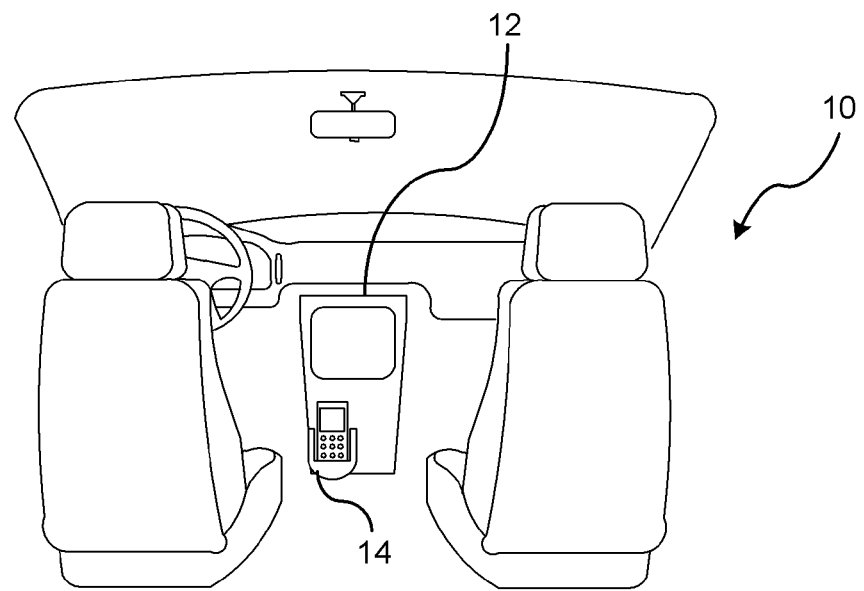
FIG. 1 is a pictorial illustration of a portable device-to-vehicle interface system.
Figure 2:
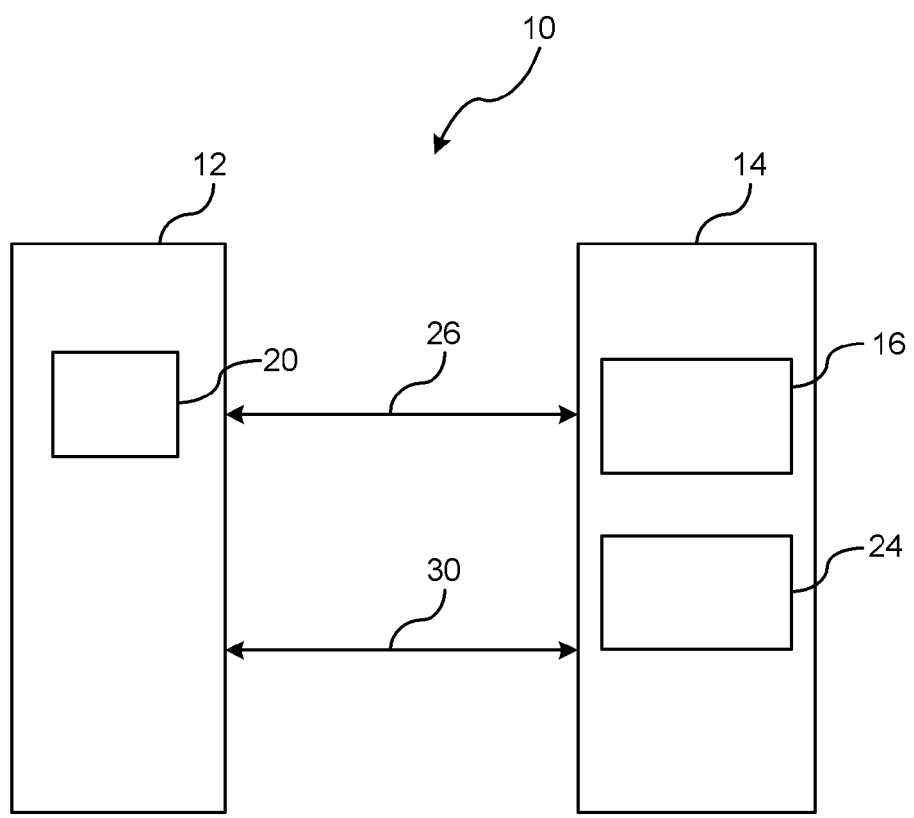
FIG. 2 is a block diagram of the portable device-to-vehicle interface system.

There is shown in FIGS. 1 and 2, a pictorial illustration and a block diagram of a portable device-to-vehicle interface system shown generally at 10. The portable device-to-vehicle interface communication system 10 may function similar to that described in co-pending application Ser. No. 12/752,437 filed Apr. 1, 2010 which is incorporated herein in its entirety. The system 10 includes a vehicle interface system 12 that communicates with a portable device 14.

The portable device 14 is carried by a user of the vehicle and is capable of storing and executing a plurality of software applications 16 (hereinafter referred to as slave software applications) that utilize video in the form of a graphical user interface that is output on the screen of the vehicle interface device 12. The graphical user interface represents the information and actions available to a user through graphical icons and other visual indicators. The actions are usually performed through direct manipulation of the graphical elements by a user via an input device such as a touch screen, a hardware input controller, or a voice recognition system. Examples of a portable device 14 include, but are not limited to, smartphones, netbooks, e-reader, personal digital assistant (PDA) and any other device capable of running the plurality of software applications. The plurality of slave software applications 16 includes, but is not limited to, music, DVD, phone, navigation, weather, email and a web browser. Only applications approved for usage in the vehicle by a testing entity (e.g. an auto OEM, a consortium, or a test lab) are allowed to access the vehicle interface device 12. This minimizes the risk of utilizing unauthorized software that may be corrupt or malicious, or may be software that is not safe to use while driving.

The purpose of the portable device-to-vehicle interface system 10 is to allow a user to execute and control an application on the portable device through the vehicle interface system 12. The vehicle-based interface system 12 includes at least one human machine interface (HMI) device 20. Preferably, the HMI 20 has dual functionality that includes accepting a user's manual input and/or presenting application content to the user. An example of an HMI 20 that includes dual functionality is a head unit of a vehicle that includes a screen for projecting video (e.g., a navigation screen) and dedicated buttons and/or a touch screen for accepting the user's selection. The purpose of the video screen is to display the video that is typically seen on the portable device 14. Video, for the purposes described herein, is any type of image (static or otherwise) that may be projected on a screen. For example, many smart phones today utilize touch screens wherein the graphical user interface is projected on the screen and selections are made by either touching an application/icon on the screen or utilizing a cursor to navigate to the application/icon. The HMI 20 projects onto a screen the video that would typically be seen on the portable device 14. This allows the driver of the vehicle to use certain slave applications via the controls of vehicle-based accessories as opposed to handling the portable device 14. As stated earlier, an application from the portable device 14 may be enabled by projecting a menu on a screen of the HMI 20 for selecting the application. If the screen is a touch screen, then a selection may be made from the screen, or if the screen is not a touch screen, then physical controls (buttons, knobs, sticks, etc.) such as those found on the steering wheel may be reconfigured to guide the user through the applications displayed on the screen of the HMI 20.

A generic data communication channel 26 is used between the portable device 14 and the vehicle interface system 12. The generic data communication channel 26 is used to transfer general data such as input device signals, vehicle data, or an exchange of certificates for authentication between the portable device 12 and the vehicle interface system 14. The vehicle may either contain a pre-existing key or the vehicle may include key generating hardware (such as a trusted platform module) and software for producing the key that is provided to the portable device 14. The authentication between the communicating devices may utilize key authentication that includes symmetric cryptography or asymmetric cryptography. For symmetric cryptography (e.g. PKI), key certificates may be distributed by certificate authorities that function as a trusted third party for communicating with both parties holding the public keys for verifying that the key holders are authorized. It should be understood that authentication processes described herein is not limited to the authentication or encryption technique as described and other authentication techniques that may be used in order for the vehicle interface system 12 to authenticate the portable device 14 or the portable device 14 to authenticate the vehicle interface system 12 over the generic data communication channel 26.

The system 10 further includes a protocol driver 24 that is a software program used to allow the portable device 14 to communicate with the vehicle interface system 12 over the communication channel 26. The protocol driver 24 interfaces with applications, instructions, libraries and the operating system on the device to govern the messaging between the portable device 14 and the vehicle interface system 12. The protocol driver 24 regulates how the portable device 14 communicates with the vehicle interface system 12 to enable authentication, configuration of the HMI 20, exchange of content, and exchange of control information. The protocol driver 24 may govern just the communication protocol, or also extend to define programming language syntax and software function calls. The vehicle interface system 12 may contain a similar communication driver that allows the system 12 to communicate with the portable device 14 over the communication channel 26.

As described above, a technique for ensuring that the video projecting device is approved is to require the device to authenticate itself to the vehicle. This authentication typically happens over a generic data channel such as USB or Wi-Fi as described above. If the video signal also gets transported over the generic data channel, then the vehicle can be relatively certain that the same device that authenticated with the vehicle is the same device transferring the video over the generic data channel. However, if the device uses a video signaling mechanism outside of the channel used to authenticate the device to the vehicle, then there is a security hole that allows a second unapproved device to send video to the vehicle screen using the out-of-band channel while the first authenticated device continues to use the generic data channel.

A video connection 30 is a channel separate from the generic data channel 26 that is configured to transmit video to the vehicle interface device 12. The video connection 30 is primarily dedicated for video transmission, but may also be used for data (non-video) transmission. The transmitted video is used by the HMI 20 for projecting the video on a display of the HMI 20. The video connection 30 can be any connection that is capable of transmitting the video from the remote device 14 to the vehicle interface system 12. The video connection 30 is an out-of-band video connection channel that is capable of carrying the video content. The video connection may be an analog video channel, a digital video channel, or a wireless video channel. Such connections may include HDMI cables, Display Port cables, analog video cables such as composite, RGB, and S-video, or a wireless system using wireless technology such as WHDI, Wi-Fi Display, or WirelessHD.

The video connection 30 is also used by the vehicle interface device 12 to re-authenticate the portable device 14 as an authorized device to transmit video over the video connection 30. The portable device 14 is authenticated over the video connection 30 prior to transmitting the video. This ensures that the video being transmitted over the video connection 30 is only from the portable device 14 and that a third device is not maliciously transmitting video. The device authentication over the video channel 30 can occur at various time intervals to ensure that the device sending video over the channel 30 has the proper credentials.

Figure 3:
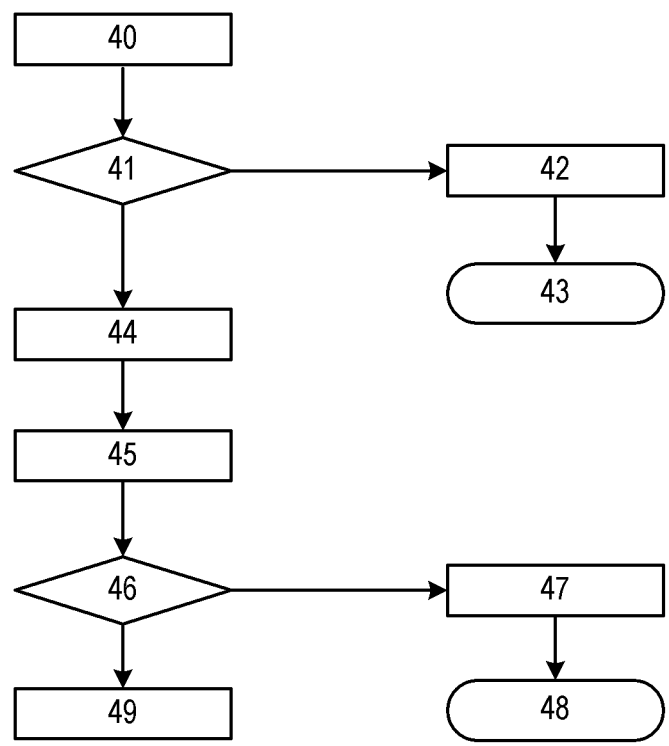
FIG. 3 is a flowchart of a method for authenticating a portable device for transmitting video to a vehicle interface system according to a first preferred embodiment.
Figure 4:
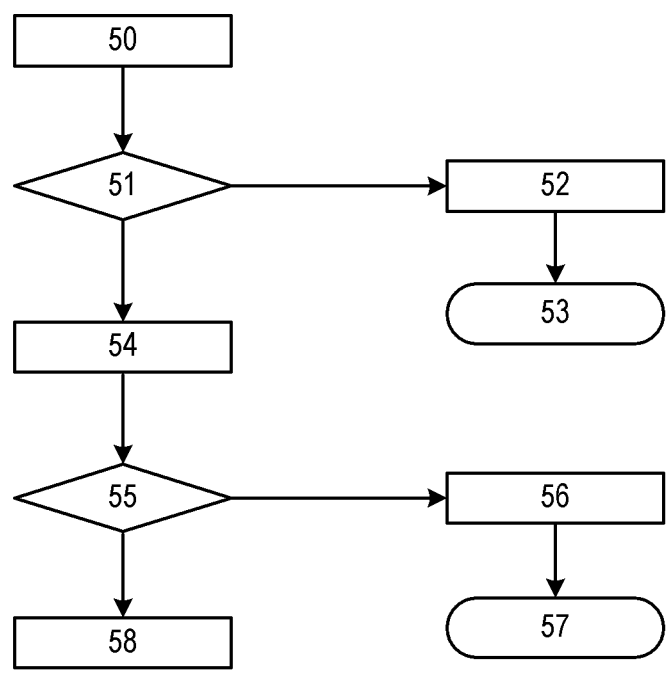
FIG. 4 is a flowchart of a method for authenticating a portable device for transmitting video to a vehicle interface system according to a second preferred embodiment.

The following processes as illustrated in FIGS. 3 and 4 describe some of the techniques that can be used to authenticate the portable device 14 over the video connection.

In FIG. 3, a first embodiment is disclosed for authenticating the portable device. In step 40, an authentication process is initiated over the generic data channel. The authentication process may be initiated by the vehicle interface device or the portable device. The portable device and the vehicle interface device exchange certificates over the generic data channel. A certificate is an electronic document that binds an electronic key with an identity. The certificate is used to validate that the communicating entity is who it purports to be. The certificates, as described, are commonly used with public key infrastructures; however, any authentication process may be used to validate the identity of the communicating devices.

In step 41, a determination is made as to whether the authentication is valid or invalid. If the authentication is invalid, then the routine proceeds to step 42; otherwise, the routine proceeds to step 44.

In step 42, the vehicle interface device terminates communication with the portable communication device and no information is transmitted over the video connection.

In step 43, a message is transmitted to the user indicating that the authentication has failed.

In step 44, in response to a successful validation of the authentication process (step 41), the vehicle interface device transmits a code to the portable device. The code is transmitted over the generic data channel. The code may be an encrypted code that is capable of being decrypted by the portable device, or it may be an unencrypted code. The code can be pre-determined or generated randomly. Alternatively, the code can be any type of signal that is recognized by the portable device so that the portable device may respond accordingly.

In step 45, the portable device receives the code transmitted over the generic data channel and re-transmits the code or a predetermined response signal to the vehicle interface device via the video connection. The code or response signal is identifiable by the vehicle interface device for establishing authenticity of the portable device over the video connection.

In step 46, the vehicle interface device determines if the code or the response signal transmitted over the video connection is valid. If the code is invalid, then the routine proceeds to step 47; otherwise, the routine proceeds to step 49.

In step 47, the vehicle interface device disallows any video from being transmitted over the video connection.

In step 48, the vehicle interface device sends a message to the user identifying the failed authentication. The message can be directly output as a visual or audible message by the vehicle interface device to the user identifying the failed authentication. Alternatively, the message may be transmitted to the portable device via the generic data channel in which the portable device notifies the user. No video is output over the video connection until authentication of the portable device is validated.

In step 49, in response to the code being valid (step 46), video is transmitted from the portable device to the vehicle interface device.

FIG. 4 represents a second embodiment for authenticating the portable device for transmitting video over the video connection. In step 50, an authentication process is initiated over the generic data channel. The authentication process is a mutual exchange of certificates (or other authentication method) and may be initiated by the vehicle interface device or the portable device.

In step 51, a determination is made as to whether the authentication of the certificates is valid or invalid. If the authentication is invalid, then the routine proceeds to step 52; otherwise, the routine proceeds to step 53.

In step 52, the vehicle interface device terminates communication with the portable communication device and no information is transmitted over the video connection. The routine proceeds to step 53.

In step 53, a message can be transmitted to the user identifying that the authentication has failed.

In step 54, in response to a successful validation of the authentication process (step 51), the portable device transmits a certificate to the vehicle interface device over the video connection. The certificate may be a same certificate used by the portable device when the mutual authentication was executed in step 50 or can be different certificate.

In step 55, the vehicle interface device receives the certificate transmitted over the video connection and determines its authenticity. A valid certificate indicates that the portable device is pre-approved to use the video connection. If the certificate in invalid, then the routine proceeds to 56; otherwise, the routine proceeds to step 58.

In step 56, the vehicle interface device disallows any video transmitted over the video connection. The routine proceeds to step 57.

In step 57, the vehicle interface device sends a message to the user identifying the failed authentication. The message can be directly output as a visual or audible message by the vehicle interface device to the user identifying the error.

Alternatively, the message may be transmitted to the portable device via the generic data channel in which the portable device notifies the user. No video is output over the video connection until authentication of the portable device is validated.

In step 58, in response to a successful validation of the certificate of the portable device over the video connection (step 55), video is transmitted from the portable device to the vehicle interface device via the video connection.

The mechanism used for allowing or disallowing video from the portable device to the vehicle interface device may be housed in the vehicle interface device. It can be a video conversion chip that turns on or off, a switch, or any other mechanism commonly used in displays to turn on or off the video input. Moreover, the determination of whether a respective slave software application is an approved software application may be performed separately by the portable device and the vehicle interface system. While certain embodiments of the present invention have been described in detail, those familiar with the art to which this invention relates will recognize various alternative designs and embodiments for practicing the invention as defined by the following claims.

What is claimed is:

1. A method for enabling slave software applications from a portable device via a vehicle interface system, the portable device having at least one executable slave software application, the vehicle including a first communication channel for exchanging data communications between the portable device and the vehicle interface system, the vehicle including a second communication channel configured to transmit video to the vehicle interface system, the method comprising the steps of:

performing a mutual authentication between the portable device and the vehicle interface system using the first communication channel based on the vehicle interface system identifying the portable device as an entity authorized to execute approved slave software applications via the vehicle interface system;

initiating communication over the second communication channel by one of the portable communication device or vehicle interface system for transmitting video from the portable device to the vehicle interface system, the video including a graphical user interface for controlling the slave software applications;

authenticating the portable device over the second communication channel for verifying that the portable device is authorized to transmit the video over the second communication channel; and transmitting the video to the vehicle interface system over the second communication channel conditioned upon a successful authentication of the portable device over the second communication channel, wherein after initiating video transmission over the second communication channel, authentication is initiated at various time intervals for re-authenticating that the portable device transmitting the video is authorized to transmit video over the second communication channel.

2. The method of claim 1 wherein the vehicle interface system includes a human machine interface having a display screen for displaying the video, the human machine interface accepting a manual input by a user and presenting application content to the user for controlling the slave application software.

3. The method of claim 1 wherein after initiating video transmission over the second communication channel, the vehicle interface system transmits an authentication query at various time intervals over the second communication channel for verifying that a respective authorized device transmitting the video is authorized to transmit video over the second communication channel.

4. The method of claim 1 wherein after an initiating video transmission over the second communication channel, the portable device repeatedly transmits authentication credentials at various time intervals for verifying that the portable device is authorized to transmit video over the second communication channel.

5. The method of claim 1 wherein mutual authentication is initiated by the portable device.

6. The method of claim 1 wherein mutual authentication is initiated by the vehicle interface system.

7. The method of claim 1 wherein authenticating the portable device to the vehicle interface system over the second communication channel comprises the steps of:

the vehicle interface system transmitting a code to the portable device over the first communication channel;

the portable device receiving the code transmitted by the vehicle interface system;

the portable device transmitting the code to the vehicle interface system over the second communication channel; and establishing authenticity of the portable device in response to the vehicle interface system determining the code received over the second communication channel is valid.

8. The method of claim 7 wherein the code is encrypted.

9. The method of claim 1 wherein authenticating the portable device to the vehicle interface system over the second communication channel comprises the steps of:

the portable device transmitting a certificate to the vehicle interface system over the second communication channel in response to a successful mutual authentication between the portable device and the vehicle interface system;

the vehicle interface system receiving the certificate transmitted over the second communication channel; and establishing authenticity of the portable device in response to the vehicle interface system determining the certificate transmitted over the second communication channel is valid.

10. The method of claim 1 wherein the vehicle interface system prevents video from being transmitted over the second communication channel in response to an unsuccessful mutual authentication between the portable device and the vehicle interface system over the first communication channel.

11. The method of claim 10 wherein a message is provided to a user indicating the failed authentication.

12. The method of claim 1 wherein the vehicle interface system prevents video from being transmitted over the second communication channel in response to an unsuccessful authentication of the portable device to the vehicle interface system over the second communication channel.

13. The method of claim 12 wherein a message is provided a user indicating the failed authentication.

14. The method of claim 1 wherein the second communication channel includes a LAN communication channel for transmitting video.

15. The method of claim 14 wherein the second communication channel includes a wireless communication channel for transmitting video.

16. A portable device-to-vehicle interface system comprising:

a portable device including executable slave software applications;

a vehicle interface system including a human machine interface for displaying video having a graphical user interface for execution and control of slave software applications stored on the portable device, the video displayed on the human machine interface being transmitted from the portable device;

a first communication channel for exchanging data communications between the portable device and the vehicle interface system; and a second communication channel configured to transmit video from the portable device to the vehicle interface system;

wherein a mutual authentication between the portable device and the vehicle interface system is performed over the first communication channel, wherein the portable device is identified as an entity authorized to execute slave software applications via the vehicle interface system, wherein communication over the second communication channel for transmitting video over the second communication channel is initiated by one of the portable communication device or vehicle interface system, wherein the portable device is authenticated over the second communication channel for verifying that the portable device is the authorized entity transmitting the video over the second communication channel, wherein the portable device transmits video of an approved slave software application to the vehicle interface system over the second communication channel conditioned upon a successful authentication of the portable device over the second communication channel, and wherein after initiating video transmission over the second communication channel, authentication is initiated at various time intervals for re-authenticating that the portable device transmitting the video is authorized to transmit video over the second communication channel.

17. The portable device-to-vehicle interface system of claim 16 wherein the human machine interface includes a display screen for viewing the slave software applications, wherein the graphical user interface is displayed on the display screen for controlling the slave software application.

18. The portable device-to-vehicle interface system of claim 16 wherein the vehicle interface system prevents video from being transmitted over the second communication channel in response to an unsuccessful authentication of the portable device over the second communication channel.

19. The portable device-to-vehicle interface system of claim 16 wherein the second communication channel includes a LAN communication channel.

20. The portable device-to-vehicle interface system of claim 16 wherein the second communication channel includes a wireless communication channel.

* * * * *